(12) United States Patent
Jiang (10) Patent No.: US 11,960,328 B2
(45) Date of Patent: Apr. 16, 2024

(54) LIQUID CRYSTAL DISPLAY PANEL AND ALIGNMENT METHOD THEREOF

(71) Applicants: WUHAN CHINA STAR OPTOELECTRONICS TECHNOLOGY CO., LTD., Hubei (CN); WUHAN CHINA STAR OPTOELECTRONICS SEMICONDUCTOR DISPLAY TECHNOLOGY CO., LTD., Hubei (CN)

(72) Inventor: Guobao Jiang, Hube (CN)

(73) Assignees: WUHAN CHINA STAR OPTOELECTRONICS TECHNOLOGY CO., LTD., Hubei (CN); WUHAN CHINA STAR OPTOELECTRONICS SEMICONDUCTOR DISPLAY TECHNOLOGY CO., LTD.

( * ) Notice: Subject to any disclaimer, the term of this patent is extended or adjusted under 35 U.S.C. 154(b) by 0 days.

(21) Appl. No.: 17/607,659

(22) PCT Filed: Aug. 11, 2021

(86) PCT No.: PCT/CN2021/111961
§ 371 (c)(1),
(2) Date: Oct. 29, 2021

(87) PCT Pub. No.: WO2023/004885
PCT Pub. Date: Feb. 2, 2023

(65) Prior Publication Data
US 2024/0028085 A1 Jan. 25, 2024

(30) Foreign Application Priority Data

Jul. 30, 2021 (CN) .......................... 202110872191.0

(51) Int. Cl.
*G06F 1/16* (2006.01)
*G02F 1/1333* (2006.01)

(52) U.S. Cl.
CPC ...... *G06F 1/1681* (2013.01); *G02F 1/133305* (2013.01); *G06F 1/1652* (2013.01)

(58) Field of Classification Search
None
See application file for complete search history.

(56) References Cited

U.S. PATENT DOCUMENTS

| 10,664,021 B1* | 5/2020 | Hsu | G06F 1/1626 |
| 11,009,061 B2* | 5/2021 | Chang | E05D 11/06 |
| 11,336,759 B2* | 5/2022 | Liao | H04M 1/022 |

(Continued)

*Primary Examiner* — James Wu
*Assistant Examiner* — Christopher L Augustin
(74) *Attorney, Agent, or Firm* — PV IP PC; Wei Te Chung; Zhigang Ma (57) ABSTRACT

The present application provides a foldable display device. The foldable display device includes a display panel and a rotation mechanism supporting the display panel. The rotation mechanism includes a first sliding member and a second sliding member. The first sliding member and the second sliding member are slidably connected to the first base. Relative sliding of the first sliding member and the second sliding member drives opposite sides of the rotation mechanism to be folded synchronously to improve fluency and stability in a folding process.

20 Claims, 7 Drawing Sheets

(56) References Cited

U.S. PATENT DOCUMENTS

2016/0097227 A1* 4/2016 Hsu .................. G06F 1/1681
                                                  16/354
2020/0409429 A1* 12/2020 Hsu .................. G06F 1/1681
2021/0055763 A1*  2/2021 Park ................. G06F 1/1681
2021/0355988 A1* 11/2021 Cheng ............... G06F 1/1681

* cited by examiner

LIQUID CRYSTAL DISPLAY PANEL AND ALIGNMENT METHOD THEREOF

RELATED APPLICATION

This application is a Notional Phase of PCT Patent Application No. PCT/CN2021/111961 having international filing date of Aug. 11, 2021, which claims priority to China Patent Application No. 202110872191.0, titled "FOLDABLE DISPLAY DEVICE", filed with China National Intellectual Property Administration on Jul. 30, 2021, and all of the entire contents of which are hereby incorporated by reference in its entirety.

FIELD OF DISCLOSURE

The present application relates to a field of display technology and in particular, to a foldable display device.

DESCRIPTION OF RELATED ART

Flexible foldable display devices are more and more popular on the market. Flexible mobile phones refer to mobile phones with bendable and flexible screens. Compared with conventional screens, flexible screens have obvious advantages. The flexible screens not only provide users with new functions, smaller sizes, and lower power consumption, but also have flexibility to reduce a risk of screen cracking.

Folding hinges are important components for realizing foldability of flexible display devices, and play an important role in protecting screens, synchronous folding, and so on. At present, the method for realizing synchronous folding of the folding hinges is to provide a synchronization structure including multiple cooperating gears. The gears in the synchronization structure are engaged with each other to achieve coordinated rotation, thereby driving flexible screens on both sides to fold synchronously. However, the rotation of the gears can lack smoothness due to the factor of meshing accuracy, and it is easy to cause damage to teeth of the gears, thereby affecting the smoothness of the synchronous folding of the display device.

Conventional synchronization structures have a technical problem of poor fluency in folding processes.

SUMMARY

The present application provides a foldable display device, which alleviates a technical problem of poor fluency during a folding process of a synchronization structure in a conventional foldable display device.

The present application provides a foldable display device, comprising a display panel and a rotation mechanism supporting the display panel, the rotation mechanism comprising:
  a first base;
  a first sliding member and a second sliding member, wherein the first sliding member is slidably connected to the first base, the second sliding member is slidably connected to the first base, the first sliding member is slidably connected to the second sliding member, the first sliding member comprises a first guide rail, the second sliding member comprises a second guide rail; and
  a first torsion member and a second torsion member, wherein the first torsion member is rotatably connected to one side of the first base to rotate about a first rotation axis, the second torsion member is rotatably connected to another side of the first base to rotate about a second rotation axis, the first torsion member comprises a first connection element, the second torsion member comprises a second connection element, the first connection element is slidably connected to the first guide rail, and the second connection element is slidably connected to the second guide rail;
  wherein a central axis of the first connection element does not coincide with the first rotation axis, and a central axis of the second connection element does not overlap with the second rotation axis.

In the foldable display device according to the present application, the first base comprises a receiving groove, a first sliding portion is disposed on one side of the receiving groove, and the first sliding member is slidably connected to the first sliding portion; and
  a second sliding portion is disposed on another side of the receiving groove, and the second sliding member is slidably connected to the second sliding portion.

In the foldable display device according to the present application, a third sliding portion is disposed on one side of the first sliding member, and a fourth sliding portion is disposed on another side of the first sliding member; and the third sliding portion is slidably connected to the first sliding portion.

In the foldable display device according to the present application, a fifth sliding portion is disposed on one side of the second sliding member, and a sixth sliding portion is disposed on another side of the second sliding member; and the fifth sliding portion is slidably connected to the second sliding portion, and the fourth sliding portion is slidably connected to the sixth sliding portion.

In the foldable display device according to the present application, the first sliding portion comprises a first guiding groove, and the third sliding portion comprises a first bump slidably engaged with the first guiding groove.

In the foldable display device according to the present application, the second sliding portion comprises a second guiding groove, and the fifth sliding portion comprises a second bump slidably engaged with the second guiding groove.

In the foldable display device according to the present application, the fourth sliding portion comprises a third bump, and the sixth sliding portion comprises a third guiding groove slidably engaged with the third bump.

In the foldable display device according to the present application, an extending direction of the first guide rail is perpendicular to an extending direction of the first bump; and
  an extending direction of the second guide rail is perpendicular to an extending direction of the second bump.

In the foldable display device according to the present application, the extending direction of the first bump is inclined with respect to a plane in which the display panel is located, and the extending direction of the second bump is inclined with respect to the plane in which the display panel is located.

In the foldable display device according to the present application, an extending direction of the third bump is parallel to a plane in which the display panel is located, and an extending direction of the third guiding groove is parallel to the plane in which the display panel is located.

In the foldable display device according to the present application, the first guide rail comprises a groove structure or a hole structure, and the second guide rail comprises a groove structure or a hole structure; and the first connection element and the second connection element both comprise a rod structure.

In the foldable display device according to the present application, the foldable display device further comprises a first rotation shaft and a second rotation shaft, the first torsion member is rotatably connected to the first base through the first rotation shaft, and the second torsion member is rotatably connected to the first base through the second rotation shaft.

In the foldable display device according to the present application, the foldable display device further comprises a third torsion member sleeved on the first rotation shaft and the second rotation shaft, a first elastic member sleeved on the first rotation shaft, and a second elastic member sleeved on the second rotation shaft.

In the foldable display device according to the present application, the first torsion member comprises a first cam sleeved on the first rotation shaft; the second torsion member comprises a second cam sleeved on the second rotation shaft; and the third torsion member comprises a third cam sleeved on the first rotation shaft and engaged with the first cam, and a fourth cam sleeved on the second rotation shaft and engaged with the second cam.

In the foldable display device according to the present application, two opposite ends of the first elastic member abut against the third torsion member and the first base, respectively, and two opposite ends of the second elastic member abut against the third torsion member and the first base, respectively.

In the foldable display device according to the present application, the foldable display device further comprises a second base fixedly connected to the first base, and a first support plate and a second support plate rotatably connected to the second base.

In the foldable display device according to the present application, the first support plate comprises a third guide rail, and one end of the first torsion member away from the first base is slidably connected to the third guide rail; and
  the second support plate comprises a fourth guide rail, and one end of the second torsion member away from the first base is slidably connected to the fourth guide rail.

In the foldable display device according to the present application, the third guide rail comprises a first sliding hole defined on one side of the first support plate away from the display panel, and the fourth guide rail comprises a second sliding hole defined on one side of the second support plate away from the display panel;
  one end of the first torsion member away from the first base is provided with a first sliding rod, and the first sliding rod is slidably connected to the first sliding hole; and
  one end of the second torsion member away from the first base is provided with a second sliding rod, and the second sliding rod is slidably connected to the second sliding hole.

In the foldable display device according to the present application, the second base comprises a first sliding groove and a second sliding groove defined on one side of the second base facing the display panel;
  the foldable display device further comprises a first sliding block slidably connected to the first sliding groove, and the first sliding block is fixedly connected to the first support plate; and
  the foldable display device further comprises a second sliding block slidably connected to the second sliding groove, and the second sliding block is fixedly connected to the second support plate.

The present application provides a foldable display device, comprising a display panel and a rotation mechanism supporting the display panel, the rotation mechanism comprising:
  a first base;
  a first sliding member and a second sliding member, wherein the first sliding member is slidably connected to the first base in a direction inclined with respect to a plane in which the display panel is located, the second sliding member is slidably connected to the first base in a direction inclined with respect to the plane in which the display panel is located, the first sliding member is slidably connected to the second sliding member in a direction parallel to the plane in which the display panel is located, the first sliding member comprises a first guide rail, and the second sliding member comprises a second guide rail; and
  a first torsion member and a second torsion member, wherein the first torsion member is rotatably connected to one side of the first base to rotate about a first rotation axis, the second torsion member is rotatably connected to another side of the first base to rotate about a second rotation axis, the first torsion member comprises a first connection element, the second torsion member comprises a second connection element, the first connection element slidably connected to the first guide rail, and the second connection element is slidably connected to the second guide rail;
  wherein a central axis of the first connection element does not coincide with the first rotation axis, and a central axis of the second connection element does not coincide with the second rotation axis; and
  the first connection element slides along the first guide rail in a direction perpendicular to a direction in which the first sliding member slides relative to the first base, and the second connection element slides along the second guide rail in a direction perpendicular to a direction in which the second sliding member slides relative to the first base.

Advantages of the Present Invention

The present application provides a foldable display device, which comprises a display panel and a rotation mechanism supporting the display panel. The rotation mechanism comprises a first sliding member and a second sliding member that are slidably connected to each other. Both the first sliding member and the second sliding member are slidably connected to the first base, the first sliding member comprises a first guide rail, and the second sliding member comprises a second guide rail. A first torsion member is rotatably connected to one side of the first base to rotate about a first rotation axis, and a second torsion member is rotatably connected to another side of the first base to rotate about a second rotation axis. The first torsion member comprises a first connection element, the second torsion member comprises a second connection element, the first connection element is slidably connected to the first guide rail, and the second connection element is slidably connected to the second guide rail. A central axis of the first connection element does not coincide with the first rotation axis, and a central axis of the second connection element does not coincide with the second rotation axis. The present application utilizes the first sliding member and the second sliding member that are slidably connected to each other, and both of them are slidably connected to the first base. The first sliding member is slidably connected to the first connection element on the first torsion member through the first guide rail, and the second sliding member is slidably connected to the second connection element on the second torsion member through the second guide rail. Relative sliding of the first sliding member and the second sliding member drives opposite sides of the rotation mechanism to fold synchronously to improve fluency and stability in a folding process.

BRIEF DESCRIPTION OF DRAWINGS

In order to more clearly illustrate technical solutions in the embodiments of the present invention, figures which will be described in the embodiments are briefly introduced hereinafter. It is obvious that the drawings are only for illustrating some embodiments of the present disclosure, and a person having ordinary skill in this field can obtain other figures according to these figures without inventive work.

DETAILED DESCRIPTION OF EMBODIMENTS

The present application is described with reference to accompanying drawings and specific embodiments that can be implemented. The directional terms mentioned in the present application, such as "up", "down", "front", "rear", "left", "right", "inner", "outer", and "side", are only for illustrative purposes based on the directions of the accompanying drawings. Therefore, the directional terms are used to illustrate and understand the present application, rather than to limit the present application. In the drawings, elements with similar structures are denoted by the same reference numerals.

The present application provides a foldable display device, which comprises a display panel and a rotation mechanism supporting the display panel. The rotation mechanism comprises a first sliding member and a second sliding member that are slidably connected to each other. Both of the first sliding member and the second sliding member are slidably connected to the first base, the first sliding member comprises a first guide rail, and the second sliding member comprises a second guide rail. A first torsion member is rotatably connected to one side of the first base to rotate about a first rotation axis, and a second torsion member is rotatably connected to another side of the first base to rotate about a second rotation axis. The first torsion member comprises a first connection element, the second torsion member comprises a second connection element, the first connection element is slidably connected to the first guide rail, and the second connection element is slidably connected to the second guide rail. A central axis of the first connection element does not coincide with the first rotation axis, and a central axis of the second connection element does not coincide with the second rotation axis. The present application utilizes the first sliding member and the second sliding member that are slidably connected to each other, and both of them are slidably connected to the first base. The first sliding member is slidably connected to the first connection element on the first torsion member through the first guide rail, and the second sliding member is slidably connected to the second connection element on the second torsion member through the second guide rail. Relative sliding of the first sliding member and the second sliding member drives opposite sides of the rotation mechanism to fold synchronously, which improves fluency and stability in a folding process.

Features of the foldable display device of the present application are described below in conjunction with specific embodiments.

Figure 1:
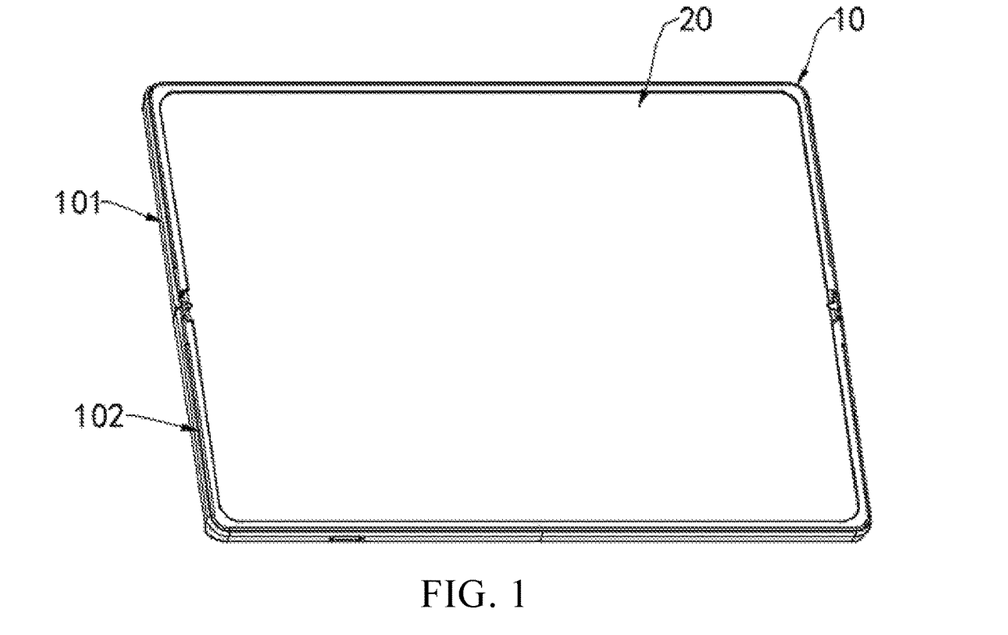
FIG. 1 is a schematic view illustrating a foldable display device in an unfolded state according to one embodiment of the present application.
Figure 2:
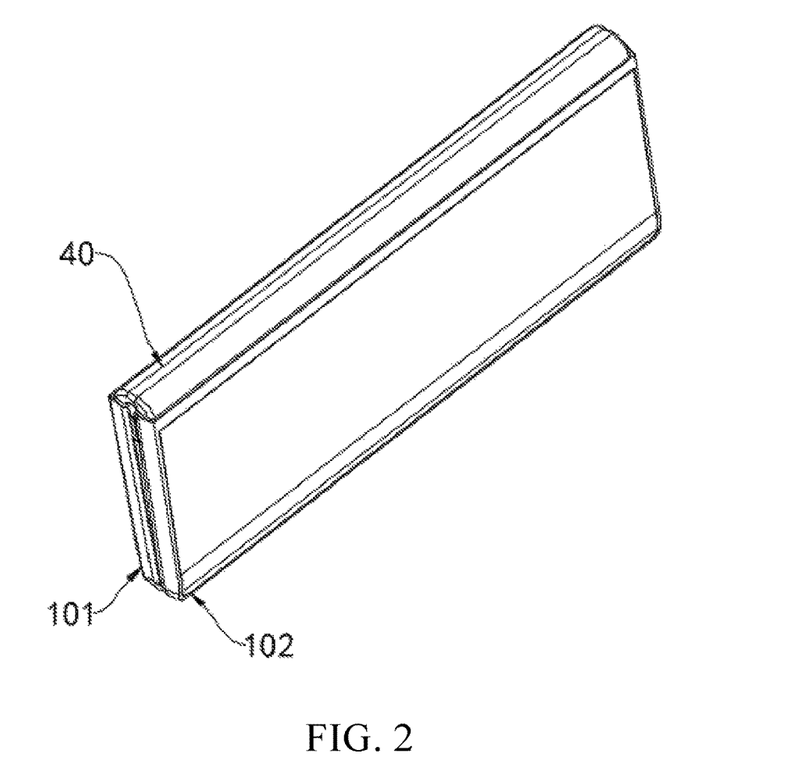
FIG. 2 is a schematic view illustrating the foldable display device in a folded state according to one embodiment of the present application.
Figure 3:
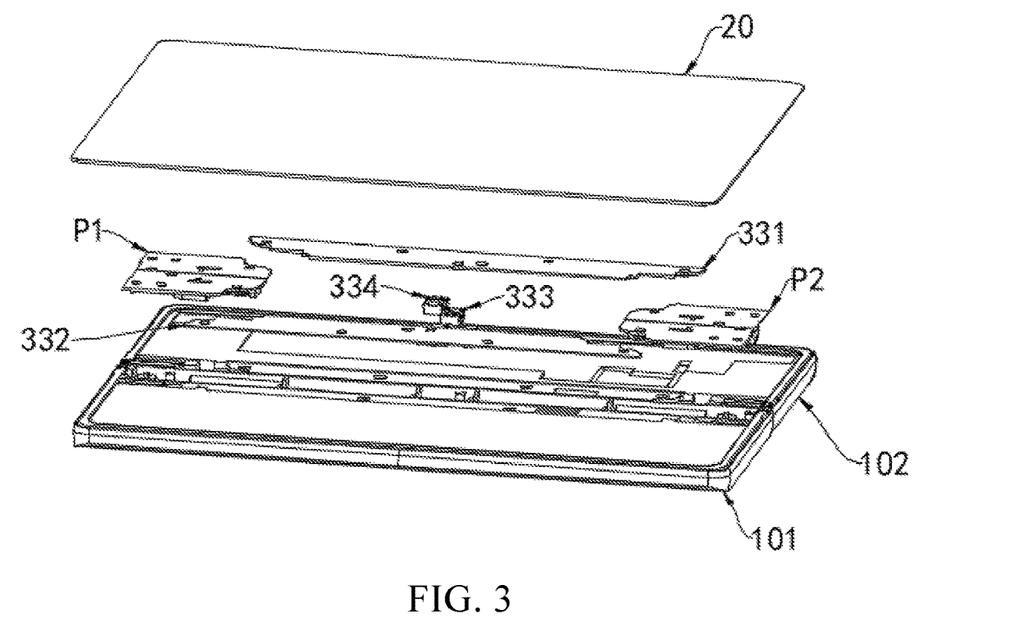
FIG. 3 is a disassembled view of the foldable display device according to one embodiment of the present application.

Please refer to FIGS. 1 to 3. FIG. 1 is a schematic view of the foldable display device in an unfolded state (a flat state) according to one embodiment of the present application, and FIG. 2 is a schematic view of the foldable display device in a folded state according to one embodiment of the present application. FIG. 3 is a disassembled view of the foldable display device according to one embodiment of the present application.

The foldable display device comprises a housing 10, a rotation mechanism arranged in an accommodating chamber of the housing 10, and a display panel 20 arranged in the housing 10 and disposed on a same side as the rotation mechanism. The housing comprises a first housing 101 and a second housing 102. The housing 10 and the rotation mechanism form a back support side of the display panel 20 so as to support the display panel 20 to switch between the unfolded state and the fully folded state.

The rotation mechanism comprises: a first end P1, a second end P2, and an intermediate support structure located between the first end P1 and the second end P2. The intermediate support structure comprises: an intermediate support plate 331, a first intermediate sliding block 333 fixedly connected to the first intermediate support plate 331, a second intermediate support plate 332, a second intermediate sliding block 334 fixedly connected to the second intermediate support plate 332, and an intermediate base slidably connected to the first intermediate sliding block 333 and the second intermediate sliding block 334. The intermediate base is fixedly connected to a cover 40 of the foldable display device.

The first end P1 and the second end P2 have a same structure, and are symmetrically arranged at opposite ends of the intermediate support structure in the rotation mechanism. The first end P1 and the second end P2 are configured to support the display panel 20 in the foldable display device and realize same angle and synchronous rotation at opposite sides of the rotation mechanism.

Figure 4:
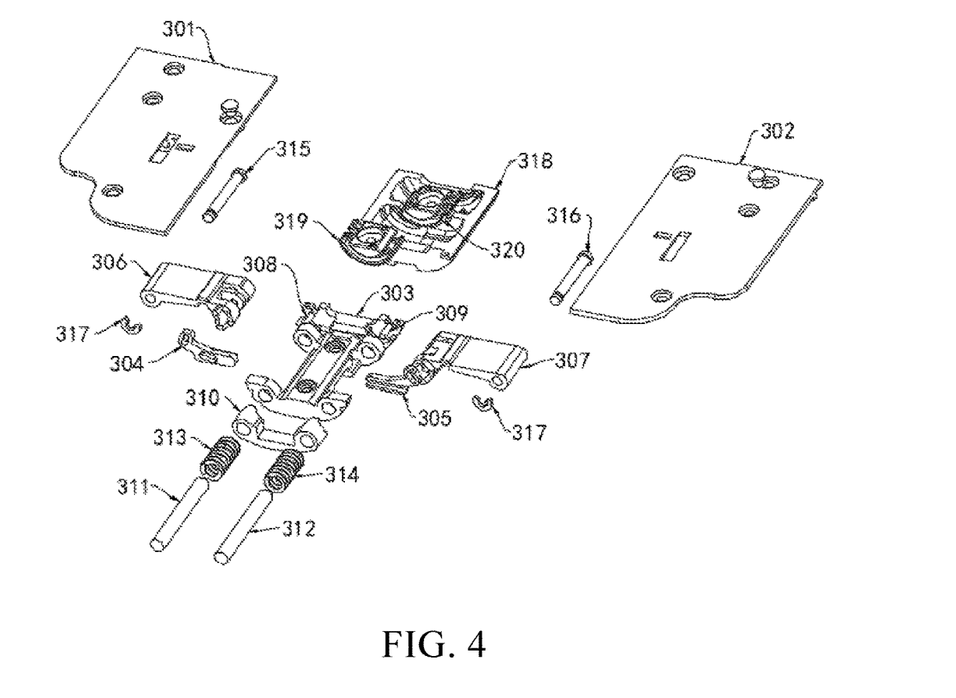
FIG. 4 is an exploded view of a first end of the rotation mechanism according to one embodiment of the present application.
Figure 5:
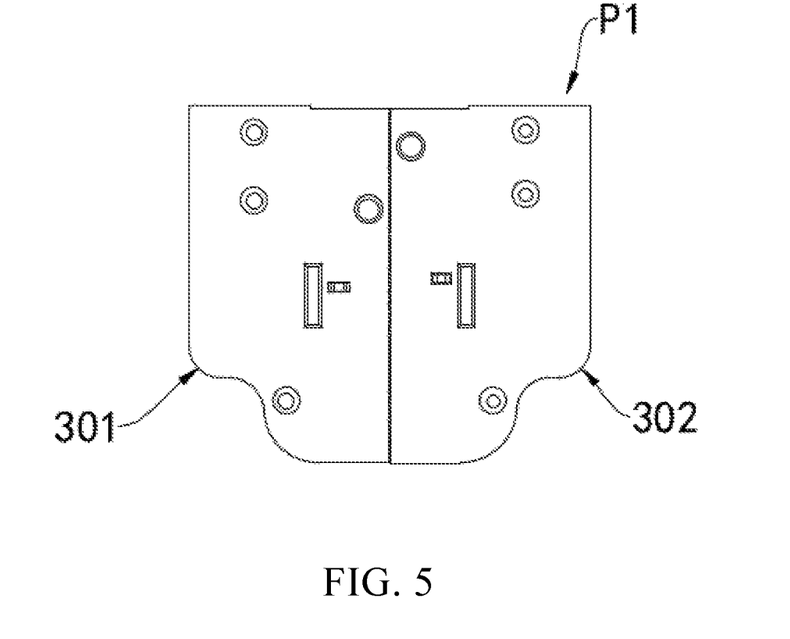
FIG. 5 is a first view of the first end in the unfolded state according to one embodiment of the present application.
Figure 6:
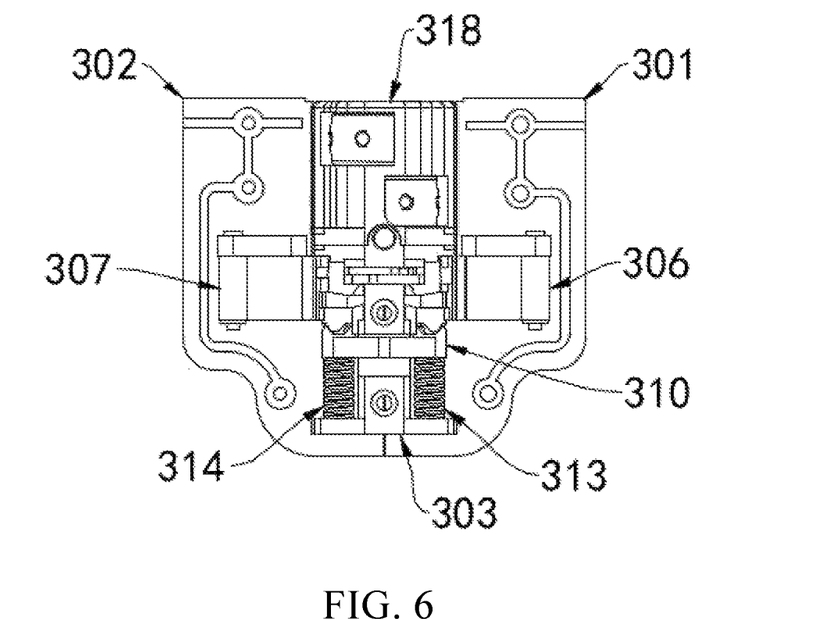
FIG. 6 is a second view of the first end in the unfolded state according to one embodiment of the present application.
Figure 7:
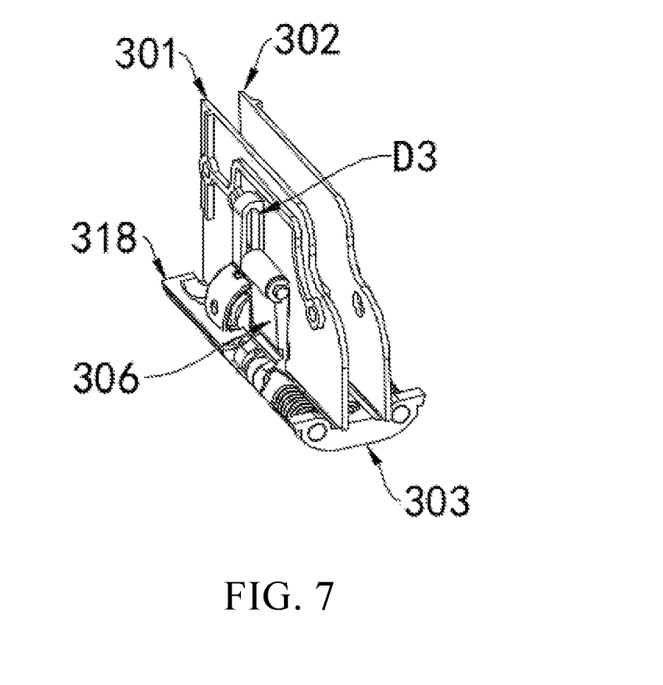
FIG. 7 is a schematic view of the first end in the folded state according to one embodiment of the present application.
Figure 8:
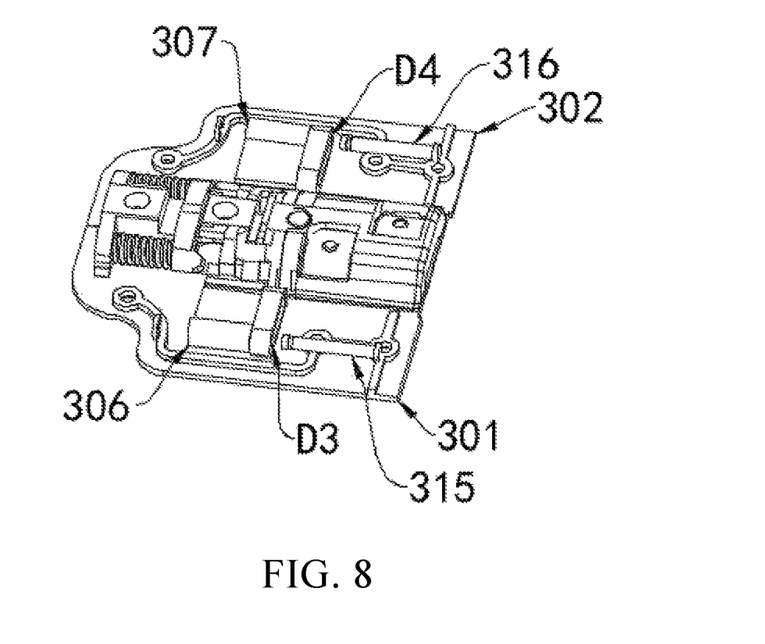
FIG. 8 is a third view of the first end in the unfolded state according to one embodiment of the present application.

Please refer to FIGS. 4 to 8. FIG. 4 is an exploded view of the first end of the rotation mechanism according to one embodiment of the present application. FIG. 5 is a first view of the first end in the unfolded state according to one embodiment of the present application. FIG. 6 is a second view of the first end in the unfolded state according to one embodiment of the present application. FIG. 7 is a schematic view of the first end in the folded state according to one embodiment of the present application. FIG. 8 is a third view of the first end in the unfolded state according to one embodiment of the present application.

The first end P1 comprises: a first base 303, a first sliding member 304 and a second sliding member 305 slidably connected to the first base 303, and a first torsion member 306 and the second torsion member 307 rotatably connected to the first base 303. The first torsion member 306 is connected to one side of the first base 303 and is rotatable relative to the first base 303 about a first rotation axis. The second torsion member 307 is connected to another side of the first base 303 and is rotatable relative to the first base 303 about a second rotation axis.

The first torsion member 306 is provided with a first connection element 308, the first connection element 308 is fixedly connected to the first torsion member 306, the first connection element 308 is slidably connected to the first sliding member 304, and a central axis of the first connection element 308 does not coincide with the first rotation axis. Therefore, when the first torsion member 306 rotates, the first connection element 308 slides relative to the first sliding member 304 and drives partial rotation of the first sliding member 304.

The second torsion member 307 is provided with a second connection element 309, the second connection element 309 is fixedly connected to the second torsion member 307, the second connection element 309 is slidably connected to the second sliding member 305, and a central axis of the second connection element 309 does not coincide with the second rotation axis. Therefore, when the second torsion member 307 rotates, the second connection element 309 slides relative to the second sliding member 305 and drives partial rotation of the second sliding member 305.

The present embodiment utilizes a sliding connection between the first sliding member 304 and the first base 303, a sliding connection between the second sliding member 305 and the first base 303, a sliding connection between the first sliding member 304 and the second sliding member 305, a sliding connection of the first sliding member 304 with respect to the first torsion member 306, and a sliding connection of the second sliding member 305 with respect to the second torsion member 307. Accordingly, the present embodiment realizes a synchronous rotation of the first torsion member 306 and the second torsion member 307 about the first base 303. Furthermore, since there is no gear transmission in this synchronization mechanism, the synchronous rotation is achieved through cooperative sliding engagement, thus improving fluency of the rotation mechanism in a rotation process.

Figure 9:
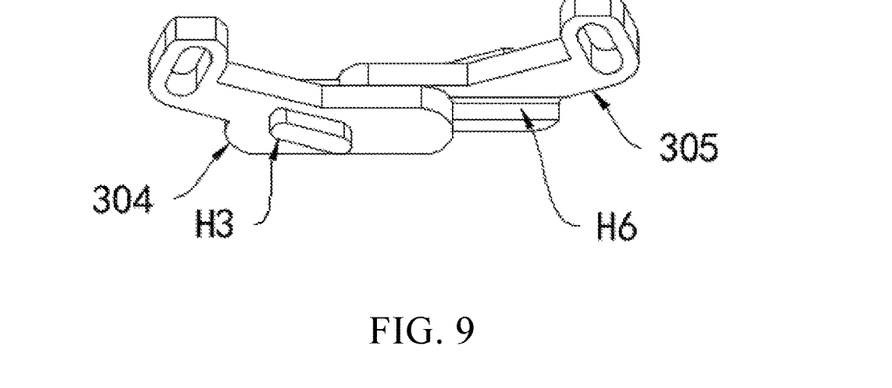
FIG. 9 is a schematic view illustrating a mating state of the first sliding member and the second sliding member according to one embodiment of the present application.
Figure 10:
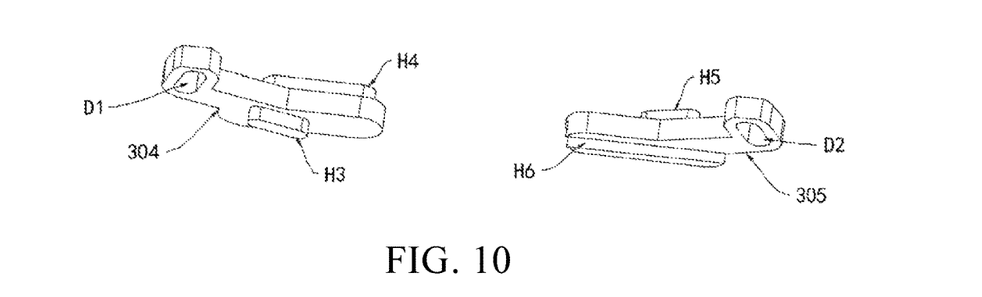
FIG. 10 is a schematic view illustrating a separated state of the first sliding member and the second sliding member according to one embodiment of the present application.
Figure 11:
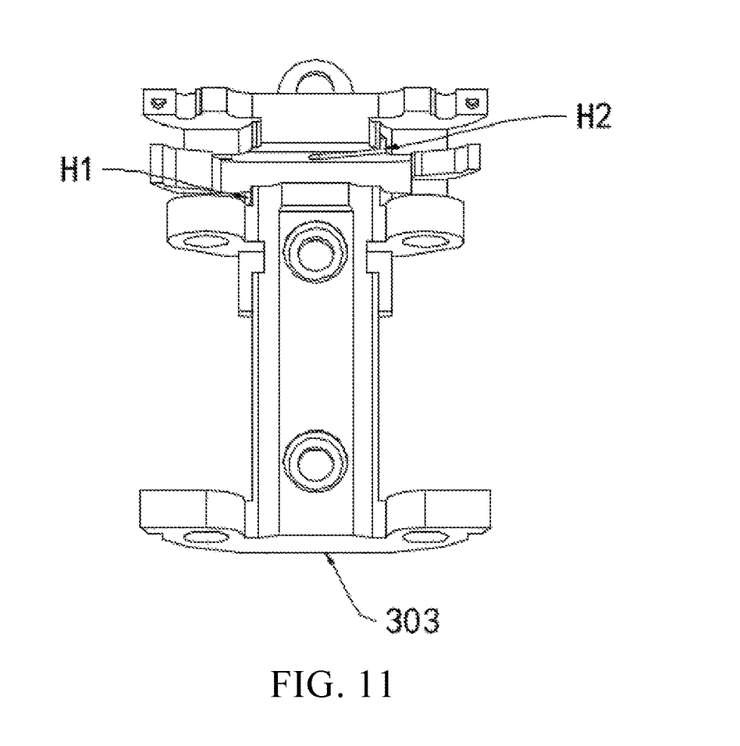
FIG. 11 is a schematic structural view of a first base according to one embodiment of the present application.

Please refer to FIG. 9 to m11. FIG. 9 is a schematic view illustrating a mating state of the first sliding member and the second sliding member according to one embodiment of the present application. FIG. 10 is a schematic view illustrating a separated view of the first sliding member and the second sliding member according to one embodiment of the present application. FIG. 11 is a schematic structural view of the first base according to one embodiment of the present application.

A first sliding portion H1 is disposed on one side of the receiving groove of the first base 303, and a second sliding portion H2 is disposed on another side of the receiving groove of the first base 303. The first sliding member 304 is slidably connected to the first sliding portion H1, and the second sliding member 305 is slidably connected to the second sliding portion H2. Accordingly, the first sliding portion H1 and the second sliding portion H2 are slidably connected to the first base 303.

Furthermore, a third sliding portion H3 is disposed on one side of the first sliding member 304, and a fourth sliding portion H4 is disposed on another side of the first sliding member 304. A fifth sliding portion H5 is disposed on one side of the second sliding member 305, and a sixth sliding portion H6 is disposed on another side of the second sliding member 305. The third sliding portion H3 is slidably connected to the first sliding portion H1, the fifth sliding portion H5 is slidably connected to the second sliding portion H2, and the fourth sliding portion H4 is slidably connected to the sixth sliding portion H6.

Optionally, the first sliding portion H1 and the third sliding portion H3 can be a bump structure and a guiding groove structure that cooperate with each other, and the second sliding portion H2 and the fifth sliding portion H5 can be a bump structure and a guiding groove structure that cooperate with each other, and the fourth sliding portion H4 and the sixth sliding portion H6 can be a bump structure and a guiding groove structure that cooperate with each other.

Further, the first sliding portion H1 comprises a first guiding groove, the second sliding portion H2 comprises a second guiding groove, and the third sliding portion H3 comprises a first bump slidably engaged with the first guiding groove. The fifth sliding portion H5 comprises a second bump slidably engaged with the second guiding groove.

The fourth sliding portion H4 comprises a third bump, and the sixth sliding portion H6 comprises a third guiding groove slidingly engaged with the third bump.

Further, the first sliding member 304 is further provided with a first guide rail D1, and the second sliding member 305 is provided with a second guide rail D2. The first connection element 308 connected to the first torsion member 306 is slidably connected to the first guide rail D1, and the second connection element 309 connected to the second torsion member 307 is slidably connected to the second guide rail D2.

Optionally, the first guide rail D1 can be a groove structure or a hole structure of the first sliding member 304, and the second guide rail D2 can be a groove structure or a hole structure of the second sliding member 305. Both the first connection element 308 and the second connection element 309 can be a rod structure.

Further, an extending direction of the first guide rail D1 is perpendicular to an extending direction of the third sliding portion H3, that is, the extending direction of the first guide rail D1 is perpendicular to an extending direction of the first bump. An extending direction of the second guide rail D2 is perpendicular to an extending direction of the fifth sliding portion H5, that is, the extending direction of the second guide rail D2 is perpendicular to an extending direction of the second bump.

The extending direction of the third sliding portion H3 is inclined with respect to a plane where the display panel 20 is located, the extending direction of the fifth sliding portion H5 is inclined with respect to the plane where the display panel 20 is located, an extending direction of the fourth sliding portion H4 is parallel to the plane where the display panel 20 is located, and an extending direction of the sixth sliding portion H6 is parallel to the plane where the display panel 20 is located. That is to say, the extending direction of the first bump is inclined with respect to the plane where the display panel 20 is located, the extending direction of the second bump is inclined with respect to the plane where the display panel 20 is located, an extending direction of the third bump is parallel to the plane where the display panel 20 is located, and an extending direction of the third guiding groove is parallel to the plane where the display panel 20 is located.

Figure 12:
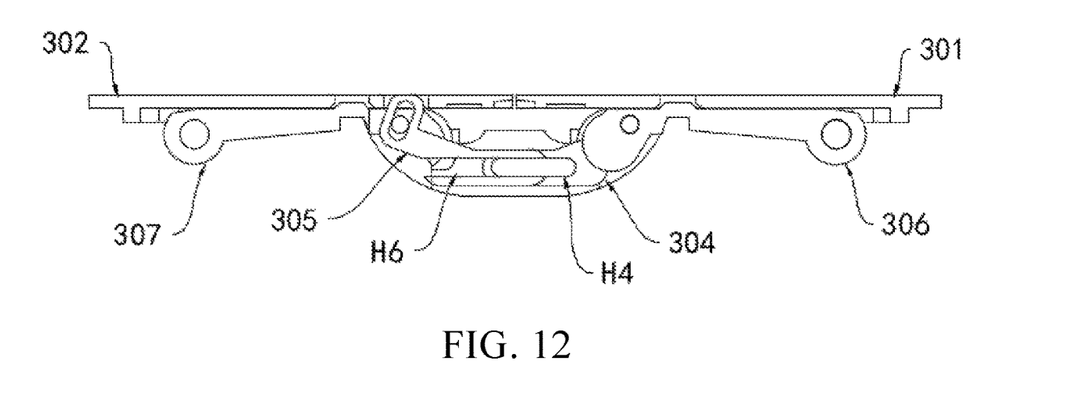
FIG. 12 is a partial transparent view of the first end in the unfolded state according to one embodiment of the present application.
Figure 13:
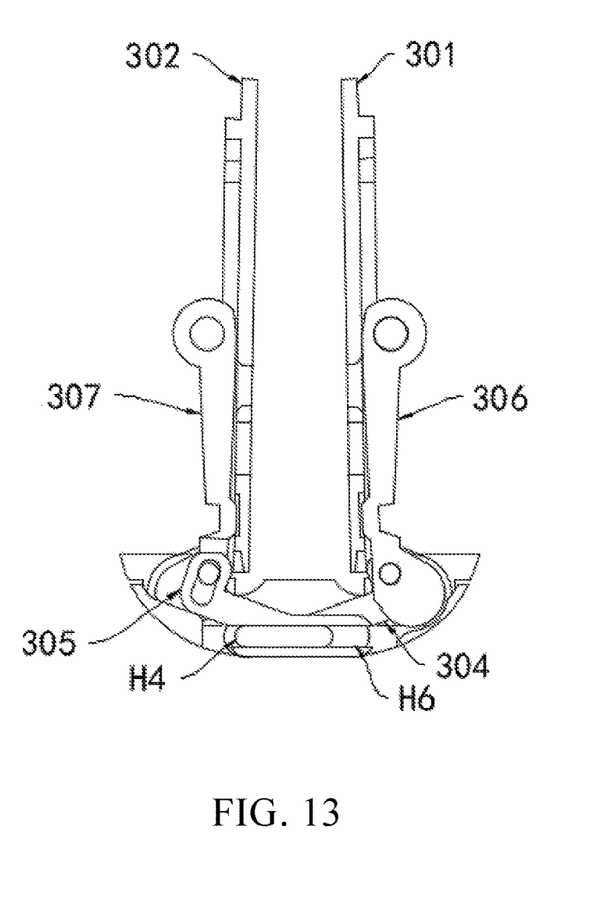
FIG. 13 is a partial transparent view of the first end in the folded state according to one embodiment of the present application.

Please refer to FIGS. 12 and 13. FIG. 12 is a partial transparent view of the first end in the unfolded state according to one embodiment of the present application. FIG. 13 is a partial transparent view of the first end in the folded state according to one embodiment of the present application. In a process of switching the first end P1 from the unfolded state to the folded state, the fourth sliding portion H4 moves relative to the sixth sliding portion H6 in a direction parallel to the plane where the display panel 20 is located. Due to sliding engagement of the first sliding portion H1 and the third sliding portion H3, and due to sliding engagement of the second sliding portion H2 and the fifth sliding portion H5, the first sliding member 304 and the second sliding member 305 synchronously move into the receiving groove of the first base 303, the first connection member 308 drives the first guide rail D1 to move, and the second connection member 309 drives the second guide rail D2 to move, thus realizing synchronous turning of the first torsion member 306 and the second torsion member 307, and realizing synchronous folding of left and right sides of the foldable display device.

Please refer to FIGS. 4 to 8. The first end P1 further comprises a first rotation shaft 311 and a second rotation shaft 312. The first torsion member 306 is rotatably connected to the first base 303 through the first rotation shaft 311, and the second torsion member 307 is rotatably connected to the first base 303 through the second rotation shaft 312. The first rotation shaft 311 and the second rotation shaft 312 are disposed on opposite sides of the first base 303, respectively. The first rotation axis is a central axis of the first rotation shaft 311, and the second rotation axis is a central axis of the second rotation shaft 312.

The first end P1 further comprises: a third torsion member 310, a first elastic member 313 sleeved on the first rotation shaft 311, and a second elastic member 314 sleeved on the second rotation shaft 312.

Figure 14:
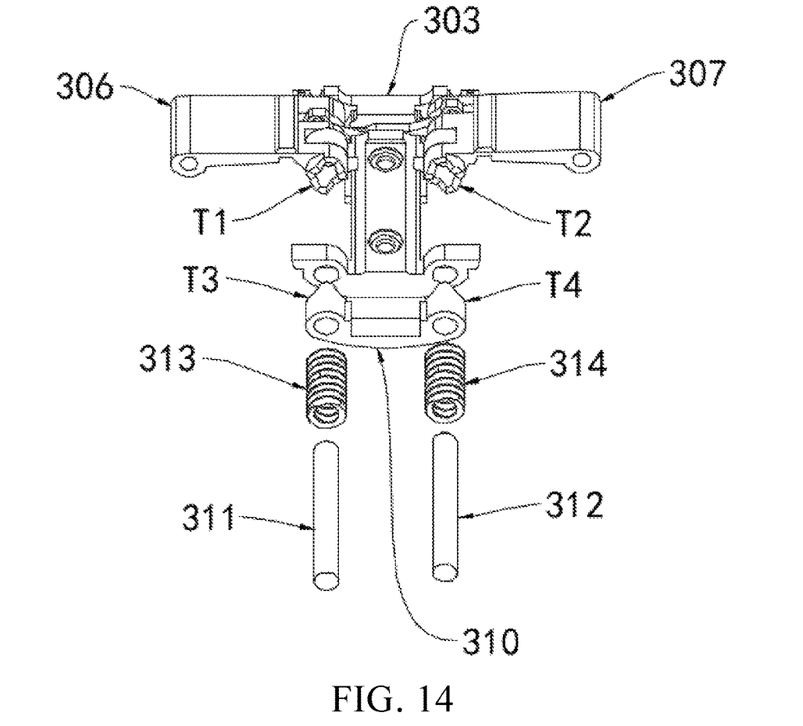
FIG. 14 is a partial disassembled view of the first end according to one embodiment of the present application.

Please further refer to FIG. 14, which is a partial disassembled view of the first end according to one embodiment of the present application. The first torsion member 306 comprises a first cam T1 sleeved on the first rotation shaft 311. The second torsion member 307 comprises a second cam T2 sleeved on the second rotation shaft 312. The third torsion member 310 comprises a third cam T3 sleeved on the first rotating shaft 311 and engaged with the first cam T1, and a fourth cam T4 sleeved on the second rotation shaft 312 and engaged with the second cam T2. Two opposite ends of the first elastic member 313 respectively abut against the third torsion member 310 and the first base 303, and two opposite ends of the second elastic member 314 respectively abut against the third torsion member 310 and the first base 303.

In the present embodiment, during rotation of the first torsion member 306 and the second torsion member 307, the present application utilizes a mating relationship between the first cam T1 and the third cam T3 and a mating relationship between the second cam T2 and the fourth cam T4, so as to exert torsion forces on the first torsion member 306 and the second torsion member 307 to drive unfolding and folding operations of the rotation mechanism.

Further, the first cam T1 and the second cam T2 are both provided with two protruding portions at equal intervals. The third cam T3 and the fourth cam T4 are provided with recessed portions corresponding to the protruding portions on the first cam T1 and the second cam T2. The present application utilizes a mating relationship between the protruding portions and the recessed portions to provide a torsion force for closing when the rotation mechanism is closed to a range of 0 degree to 30 degrees during a closing process, and provide a torsion force for unfolding when the rotation mechanism is unfolded to a range of 150 degrees to 180 degrees during an unfolding process. No torsion forces are generated in a range of 30 degrees to 150 degrees to realize automatic closing and automatic unfolding within a certain range of angles.

Optionally, both the first elastic member 313 and the second elastic member 314 are a spring.

Please refer to FIGS. 4 to 8. The first end P1 further comprises: a second base 318 fixedly connected to the first base 303, and a first support plate 301 and the second support plate 302 rotatably connected to the second base 318. The first support plate 301 comprises a third guide rail D3, and one end of the first torsion member 306 away from the first base 303 is slidably connected to the third guide rail D3. The second support plate 302 comprises a fourth guide rail D4, and one end of the second torsion member 307 away from the first base 303 is slidably connected to the fourth guide rail D4. The third guide rail D3 and the fourth guide rail D4 both extend from the second base 318 in a direction away from the second base 318.

The first support plate 301 drives the first torsion member 306 to rotate, the second support plate 302 drives the second torsion member 307 to rotate, and synchronous rotation of the first support plate 301 and the second support plate 302 is realized through the first sliding member 304 and the second sliding member 305.

Further, the third guide rail D3 comprises a first sliding hole defined on one side of the first support plate 301 away from the display panel 20. One end of the first torsion member 306 away from the first base 303 is provided with a first sliding rod 315. The first sliding rod 315 is slidably connected to the first sliding hole through a buckle 317, thereby achieving a sliding connection between the third guide rail D3 and the first torsion member 306.

The fourth guide rail D4 comprises a second sliding hole defined on one side of the second support plate 302 away from the display panel 20. One end of the second torsion member 307 away from the first base 303 is provided with a second sliding rod 316. The second sliding rod 316 is slidably connected to the second sliding hole through the buckle 317, thereby achieving a sliding connection between the fourth guide rail D4 and the second torsion member 307.

Figure 15:
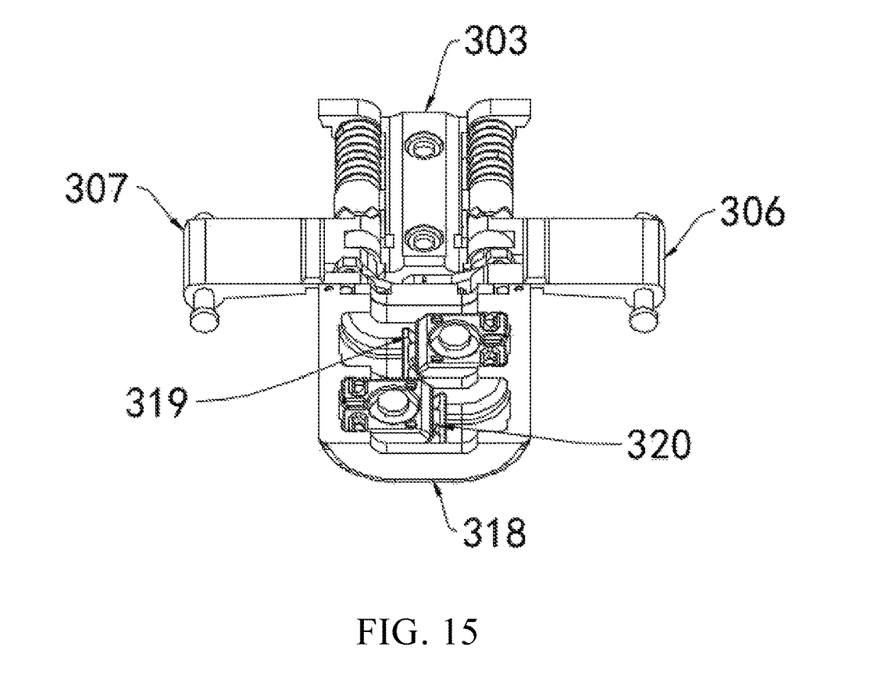
FIG. 15 is a partial structural view illustrating the first end close to a second base according to one embodiment of the present application.

Please refer to FIGS. 4 and 15. FIG. 15 is a partial structural view illustrating the first end close to the second base according to one embodiment of the present application. The second base 318 comprises a first sliding groove and a second sliding groove defined on one side of the second base facing the display panel. The first end P1 further comprises: a first sliding block 319 slidably connected to the first sliding groove, and a second sliding block 320 slidably connected to the second sliding groove. The first sliding block 319 is fixedly connected to the first support plate 301, and the second sliding block 320 is fixedly connected to the second support plate 302.

The first sliding groove and the second sliding groove are both arc-shaped grooves defined on the second base 318. By means of the first sliding block 319 fixedly connected to the first support plate 301 and the second sliding block 320 fixedly connected to the second support plate 302, the first support plate 301 and the second support plate 302 can rotate around the second base 318.

The first base 303 and the second base 318 are both fixedly connected to the cover 40 of the foldable display device.

The present application provides a foldable display device, which comprises a display panel and a rotation mechanism supporting the display panel. The rotation mechanism comprises a first sliding member and a second sliding member that are slidably connected to each other. Both the first sliding member and the second sliding member are slidably connected to the first base. The first sliding member comprises a first guide rail, and the second sliding member comprises a second guide rail. A first torsion member is rotatably connected to one side of the first base to rotate about a first rotation axis, and a second torsion member is rotatably connected to another side of the first base to rotate about a second rotation axis. The first torsion member comprises a first connection element, the second torsion member comprises a second connection element, the first connection element is slidably connected to the first guide rail, and the second connection element is slidably connected to the second guide rail. A central axis of the first connection element does not coincide with the first rotation axis, and a central axis of the second connection element does not coincide with the second rotation axis. The present application utilizes the first sliding member and the second sliding member that are slidably connected to each other, and both of them are slidably connected to the first base. The first sliding member is slidably connected to the first connection element on the first torsion member through the first guide rail, and the second sliding member is slidably connected to the second connection element on the second torsion member through the second guide rail. Accordingly, relative sliding of the first sliding member and the second sliding member is realized to drive opposite sides of the rotation mechanism to fold synchronously to improve fluency and stability in a folding process.

It should be noted that although the present application is disclosed as above with specific embodiments, the above-mentioned embodiments are not intended to limit the present application. Those of ordinary skill in the art can make various modifications without departing from the spirit and scope of the application. Therefore, the protection scope of the present application should be defined by the appended claims.

What is claimed is:

1. A foldable display device, comprising a display panel and a rotation mechanism supporting the display panel, the rotation mechanism comprising:

a first base;

a first sliding member and a second sliding member, wherein the first sliding member is slidably connected to the first base, the second sliding member is slidably connected to the first base, the first sliding member is slidably connected to the second sliding member, the first sliding member comprises a first guide rail, the second sliding member comprises a second guide rail; and a first torsion member and a second torsion member, wherein the first torsion member is rotatably connected to one side of the first base to rotate about a first rotation axis, the second torsion member is rotatably connected to another side of the first base to rotate about a second rotation axis, the first torsion member comprises a first connection element, the second torsion member comprises a second connection element, the first connection element is slidably connected to the first guide rail, and the second connection element is slidably connected to the second guide rail;

wherein a central axis of the first connection element does not coincide with the first rotation axis, and a central axis of the second connection element does not overlap with the second rotation axis.

2. The foldable display device according to claim 1, wherein the first base comprises a receiving groove, a first sliding portion is disposed on one side of the receiving groove, and the first sliding member is slidably connected to the first sliding portion; and a second sliding portion is disposed on another side of the receiving groove, and the second sliding member is slidably connected to the second sliding portion.

3. The foldable display device according to claim 2, wherein a third sliding portion is disposed on one side of the first sliding member, and a fourth sliding portion is disposed on another side of the first sliding member; and the third sliding portion is slidably connected to the first sliding portion.

4. The foldable display device according to claim 3, wherein a fifth sliding portion is disposed on one side of the second sliding member, and a sixth sliding portion is disposed on another side of the second sliding member; and the fifth sliding portion is slidably connected to the second sliding portion, and the fourth sliding portion is slidably connected to the sixth sliding portion.

5. The foldable display device according to claim 4, wherein the first sliding portion comprises a first guiding groove, and the third sliding portion comprises a first bump slidably engaged with the first guiding groove.

6. The foldable display device according to claim 5, wherein the second sliding portion comprises a second guiding groove, and the fifth sliding portion comprises a second bump slidably engaged with the second guiding groove.

7. The foldable display device according to claim 6, wherein the fourth sliding portion comprises a third bump, and the sixth sliding portion comprises a third guiding groove slidably engaged with the third bump.

8. The foldable display device according to claim 6, wherein an extending direction of the first guide rail is perpendicular to an extending direction of the first bump; and an extending direction of the second guide rail is perpendicular to an extending direction of the second bump.

9. The foldable display device according to claim 6, wherein the extending direction of the first bump is inclined with respect to a plane in which the display panel is located, and the extending direction of the second bump is inclined with respect to the plane in which the display panel is located.

10. The foldable display device according to claim 7, wherein an extending direction of the third bump is parallel to a plane in which the display panel is located, and an extending direction of the third guiding groove is parallel to the plane in which the display panel is located.

11. The foldable display device according to claim 1, wherein the first guide rail comprises a groove structure or a hole structure, and the second guide rail comprises a groove structure or a hole structure; and
the first connection element and the second connection element both comprise a rod structure.

12. The foldable display device according to claim 1, wherein the foldable display device further comprises a first rotation shaft and a second rotation shaft, the first torsion member is rotatably connected to the first base through the first rotation shaft, and the second torsion member is rotatably connected to the first base through the second rotation shaft.

13. The foldable display device according to claim 12, wherein the foldable display device further comprises a third torsion member sleeved on the first rotation shaft and the second rotation shaft, a first elastic member sleeved on the first rotation shaft, and a second elastic member sleeved on the second rotation shaft.

14. The foldable display device according to claim 13, wherein the first torsion member comprises a first cam sleeved on the first rotation shaft; the second torsion member comprises a second cam sleeved on the second rotation shaft; and the third torsion member comprises a third cam sleeved on the first rotation shaft and engaged with the first cam, and a fourth cam sleeved on the second rotation shaft and engaged with the second cam.

15. The foldable display device according to claim 14, wherein two opposite ends of the first elastic member abut against the third torsion member and the first base, respectively, and two opposite ends of the second elastic member abut against the third torsion member and the first base, respectively.

16. The foldable display device according to claim 1, wherein the foldable display device further comprises a second base fixedly connected to the first base, and a first support plate and a second support plate rotatably connected to the second base.

17. The foldable display device according to claim 16, wherein the first support plate comprises a third guide rail, and one end of the first torsion member away from the first base is slidably connected to the third guide rail; and
the second support plate comprises a fourth guide rail, and one end of the second torsion member away from the first base is slidably connected to the fourth guide rail.

18. The foldable display device according to claim 17, wherein the third guide rail comprises a first sliding hole defined on one side of the first support plate away from the display panel, and the fourth guide rail comprises a second sliding hole defined on one side of the second support plate away from the display panel;

one end of the first torsion member away from the first base is provided with a first sliding rod, and the first sliding rod is slidably connected to the first sliding hole; and one end of the second torsion member away from the first base is provided with a second sliding rod, and the second sliding rod is slidably connected to the second sliding hole.

19. The foldable display device according to claim 17, wherein the second base comprises a first sliding groove and a second sliding groove defined on one side of the second base facing the display panel;

the foldable display device further comprises a first sliding block slidably connected to the first sliding groove, and the first sliding block is fixedly connected to the first support plate; and the foldable display device further comprises a second sliding block slidably connected to the second sliding groove, and the second sliding block is fixedly connected to the second support plate.

20. A foldable display device, comprising a display panel and a rotation mechanism supporting the display panel, the rotation mechanism comprising:

a first base;

a first sliding member and a second sliding member, wherein the first sliding member is slidably connected to the first base in a direction inclined with respect to a plane in which the display panel is located, the second sliding member is slidably connected to the first base in a direction inclined with respect to the plane in which the display panel is located, the first sliding member is slidably connected to the second sliding member in a direction parallel to the plane in which the display panel is located, the first sliding member comprises a first guide rail, and the second sliding member comprises a second guide rail; and a first torsion member and a second torsion member, wherein the first torsion member is rotatably connected to one side of the first base to rotate about a first rotation axis, the second torsion member is rotatably connected to another side of the first base to rotate about a second rotation axis, the first torsion member comprises a first connection element, the second torsion member comprises a second connection element, the first connection element slidably connected to the first guide rail, and the second connection element is slidably connected to the second guide rail;

wherein a central axis of the first connection element does not coincide with the first rotation axis, and a central axis of the second connection element does not coincide with the second rotation axis; and the first connection element slides along the first guide rail in a direction perpendicular to a direction in which the first sliding member slides relative to the first base, and the second connection element slides along the second guide rail in a direction perpendicular to a direction in which the second sliding member slides relative to the first base.

* * * * *